3,234,213
18-OXYGENATED STEROIDS AND PROCESS
FOR THEIR MANUFACTURE
Oskar Jeger, Zurich, Duilio Arigoni, Zollikerberg, Georg Anner and Charles Meystre, Basel, and Albert Wettstein, Riehen, Switzerland, assignors to Ciba Corporation, a corporation of Delaware
No Drawing. Filed Feb. 9, 1960, Ser. No. 7,543
Claims priority, application Switzerland, Apr. 23, 1959, 72,443/59; Dec. 22, 1959, 82,231/59
15 Claims. (Cl. 260—239.55)

The present invention relates to a process for the manufacture of 18-oxygenated steroids from 18-unsubstituted steroids.

The 18-oxygenated steroids, particularly 18-oxygenated pregnanes, are of great interest on account of their interesting physiological effects. To this class of compounds there belongs, inter alia, aldosterone which is of considerable importance owing to its specific effect on electrolyte-metabolism. The latter compound, however, is present in the suprarenal glands only in an extremely small quantity. Larger amounts could hitherto only be prepared by total synthesis from simple chemical basic substances involving many steps. According to the present process it is now possible to obtain 18-oxygenated steroids, especially 18-oxygenated prenanes, that is to say also aldosterone and its derivatives and related compounds, in a simple manner by a direct selective substitution of the angular, non-activated methyl group at carbon atom 13 in the intact steroid skeleton. Thus, 18-oxygenated steroids can now be prepared in any quantity from readily accessible vegetable and animal steroids.

The new process comprises three main parts:
(1) The formation of an 18:20-ether starting from an 18-unsubstituted 20-hydroxy-pregnane,
(2) The splitting or oxidative conversion of the 18:20-ether into 18-hydroxy or 18-acid derivatives,
(3) The further oxidation of the resulting polyoxygenated 18-hydroxy compounds.

One method is shown in the following diagram of partial formulae with an 11-oxygenated compound as example:

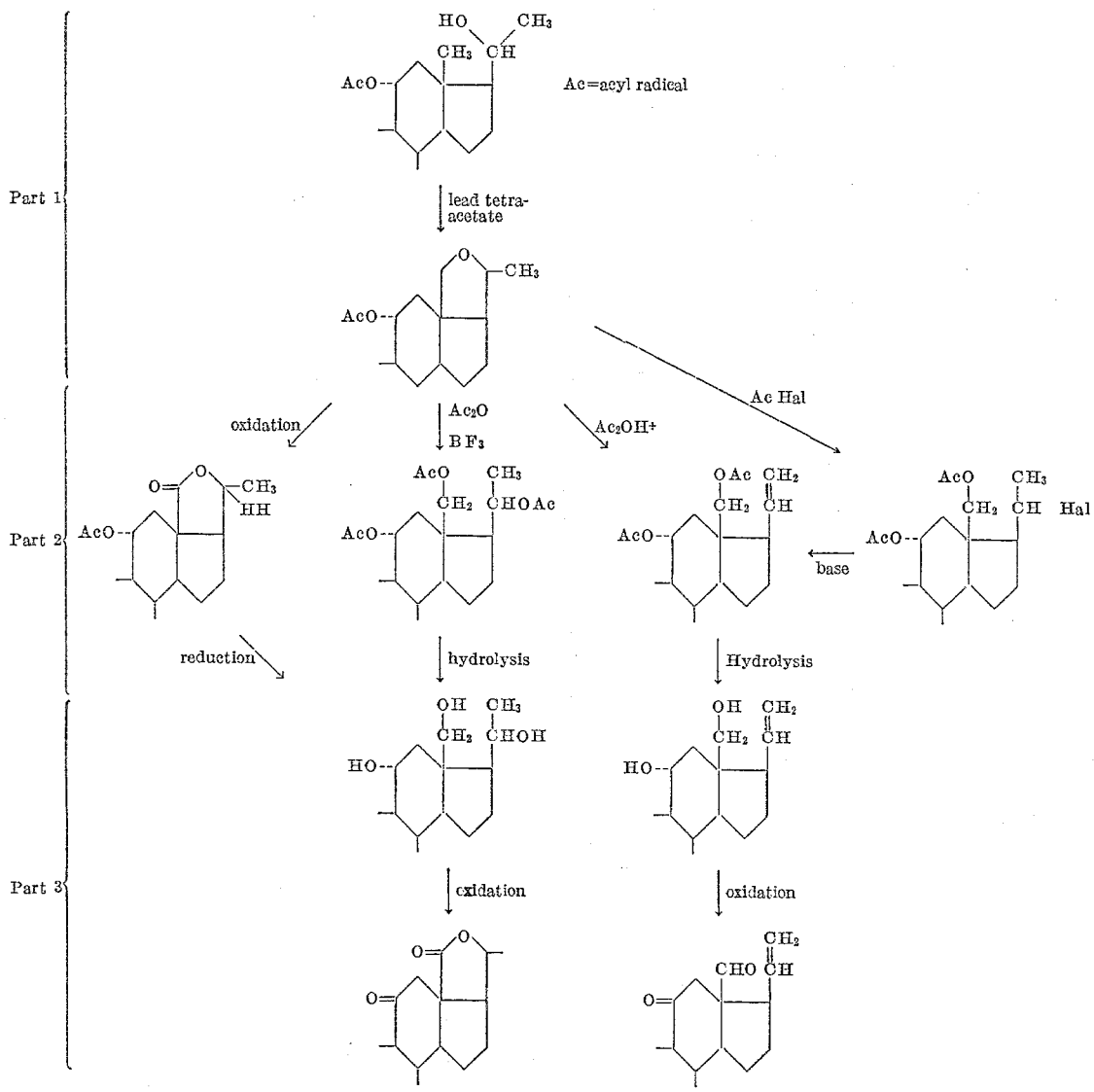

The present application concerns more especially the third part of the above described process, viz. the oxidative conversion of 18:20-dihydroxy steroids.

It has been found that valuable 19-oxo-pregnane and pregnane-18-acid derivatives can be obtained by treating an 18:20-dihydroxy-pregnane with an oxidizing agent and, if desired, in the resulting oxidation products, if desired after introducing a 4:5-double bond and/or ketalizing the oxo groups in 3-, 18- and/or 20-position, reducing any 11-oxo group present to 11-β-hydroxy group and oxidizing a resulting 18:11-lactone of an 11β:20-dihydroxy-pregnane-18-acid to form a 20-oxo compound.

For the oxidation according to the present process various oxidizing agents which can bring about dehydrogenation of alcohols to form carbonyl compounds are suitable, especially compounds of hexavalent chromium, such as sodium dichromate or especially chromium trioxide in glacial acetic acid, in acetone with the addition of sulfuric acid, or also in pyridine. Oxidation can also be carried out with an N-halogencarboxylic acid amide or imide, such as bromosuccinimide, bromacetamide and the like. Depending on the conditions used in the oxidation of 18:20-dihydroxypregnanes different products are obtained with chromium trioxide. With energetic conditions, for example in glacial acetic acid or in acetone with the addition of sulfuric acid, the 18-hydroxyl group is surprisingly quickly attached, so that as main product lactones of 20-hydroxy-pregnane-18-acids are formed. In addition 18:20-dioxo compounds (20-keto-18-als) and 18-hydroxy-20-ketones can also be formed in smaller quantities which are obtained in the form of their cyclohemiketals. The two last compounds are formed primarily in the case of mild oxidation with chromium trioxide in pyridine. Free hydroxyl groups in 3- and/or 11-position are dehydrogenated to ketones during oxidation according to the present process.

If desired, subsequent to the oxidation, a double bond can be introduced in ring A by bromination and dehydrobromination in a manner known per se especially in those compounds which have no oxo group in the 20-position (e.g. in lactones of 20-hydroxy-pregnane-18-acids).

Free oxo groups in 3-, 18- and/or 20-position can also be protected by ketalization with ethylene glycol, propylene glycol et. in the presence of an acidic catalyst. In these protected compounds, if desired, any 11-keto group present can be reduced with a complex metal hydride, for example sodium boron hydride, lithium boron hydride or lithium aluminum hydride. In the case of lactones of 11-oxo-20-hydroxy-pregnane-18-acids the use of sodium boron hydride, e.g. in alkaline solution, is especially advantageous; under these conditions translactionation of the 18:20-lactones to 18:11-lactones occurs simultaneously with the reduction of the 11-oxo group. By subsequent oxidation of the resulting free 20-hydroxyl group to the 20-oxo group, for example with chromium trioxide and pyridine, the 18:11-lactone of pregnane-20-ketone is therefore readily obtained; the conversion of this compound into aldosterone and its derivatives is already known.

As starting materials for the present process are especially suitable 18:20-dihydroxy compounds of the 5α- and 5β-pregnane series which may contain further substituents in the ring system, particularly free or functionally converted hydroxyl groups and oxo groups especially in the 3- and 11-position. The compounds may also contain double bonds, for example starting from carbon atom 5 and/or in 9:11-position. By functionally converted hydroxyl or oxo groups are to be understood esterified or etherified hydroxyl groups and ketalized oxo groups respectively. The starting materials are obtained by the process of patent application No. 7,525, filed February 9, 1960, and No. 7,542, filed February 9, 1960, for example by treating the corresponding 18-unsubstituted 20-hydroxy compounds with lead tetra-acetate, then splitting the resulting 18:20-ether with acetic anhydride in the presence of boron trifluoride, and hydrolysis.

The present invention also concerns the 18:20-lactones of 20-hydroxy-steroid-18-acids, especially the 18:20-lactones of 20-hydroxy-pregnane-18-acids, for example the 18:20-lactone of 3:11-dioxo-20-hydroxy-pregnane-18-acid, saturated or unsaturated in the 4:5-position, and the 18:20-lactone of 3β:20-dihydroxy-5α-pregnane-18-acid and its 3-esters and saturated 3:18:20-trioxo-pregnanes, such as 3:18:20-trioxo-5α-pregnane, 3:11:18:20-tetraoxo-5β-pregnane, 3:18:20-trioxo-11β-acetoxy-5α-pregnane and Δ⁴-3:11:18:20-tetra-oxo-pregnene and the derivatives, for example ketals and esters, of these compounds.

The invention also comprises saturated, 21-unsubstituted 11-oxygenated 18-hydroxy-20-oxo-pregnanes present in the form of 18:20-hemiketals, such as 3:11:20-trioxo-18-hydroxy-5β-pregnane, 3:20-dioxo-11α:18-dihydroxy - 5β - pregnane and 3:11:20-trioxo-18-hydroxy-5α-pregnane.

Resulting compounds containing no oxygen function in 11-position can be oxidized in known manner, advantageously after introduction of the Δ⁴-3-keto grouping, with the aid of micro-organisms to form 11-oxygenated compounds.

The following examples illustrate the invention:

*Example 1*

100 mg. of 3β:18:20ξ-trihydroxy-5α-pregnane are dissolved in 5 cc. of pyridine and the solution added dropwise to a suspension of 100 mg. of chromium trioxide in 5 cc. of pyridine at room temperature. After 90 minutes the solution is filtered from the precipitate, 10 cc. of methanol are added to destroy any excess oxidizing agent and the reaction mass worked up. 99 mg. of a crystalline crude product saturated against tetranitromethane are obtained which, after being recrystallized three times from a mixture of methanol and water, melt at 144–145° C. Optical rotation: $[\alpha]_D = +68°$ (in chloroform). Infrared absorption spectrum: bands at 3.68μ (18-aldehyde), broad bands at 5.81–5.89μ (3:18:20-carbonyls). The product is 3:18:20-trioxo-5α-pregnane.

By treating 3β:18:20 - trihydroxy - 11β - acetoxy-5α-pregnane with chromium trioxide in pyridine in the above described manner, 3:18:20-trioxo-11β-acetoxy-5α- pregnane is formed. In a 3:18:20-trisethylenedioxy-11β-acetoxy-5α-pregnane obtained by ketalization the ester grouping in the 11-position can advantageously be hydrolyzed by treatment with lithium aluminum hydride in tetrahydrofuran. The reaction mixture is then adjusted to pH 4–4.5 with dilute aqueous acid and kept for a few hours at room temperature, whereby the ketal groupings at carbon atoms 3, 18 and 20 are also hydrolyzed. As end product of this sequence of reactions the 11→18-semiacetal of 3:18:20-trioxo-11β-hydroxy-5α- pregnane is obtained which is oxidized with the acid of cromium trioxide in glacial acetic acid to form the 11→18-lactone of 3:20-diketo-11β-hydroxy-5α-pregnane-18-acid.

In an analogous manner, on oxidizing 1 gram of 3α:11α:18:20-tetrahydroxy-5β-pregnane with 800 mg. of chromium trioxide in 60 cc. of pyridine, there is obtained crystalline 3:11:18:20-tetraoxo-5β-pregnane after purification by chromatography. The latter product can be converted into 3:18:20 - tris - ethylenedioxy-11-keto-5β-pregnane by boiling for 4 hours in a benzene solution with ethylene glycol in the presence of a trace of para-toluene-sulfonic acid. The reaction product is then converted into 3:18:20 - trisethylenedioxy-11β-hydroxy-5β-pregnane in high yield by reduction with lithium aluminum hydride in absolute tetrahydrofuran. The ketal groupings of 3:18:20-tris-ethylenedioxy-11β-hydroxy-5β-pregnane are hydrolyzed by being treated with aqueous acetic acid of 50% strength for one hour on a water bath.

100 mg. of the resulting 11→18-semi-acetal of 3:18:20-triketo-11β-hydroxy-5β-pregnane are then dissolved in 10 cc. of pyridine and 50 mg. of chromium trioxide added to the solution. After allowing the whole to stand for 2 hours at room temperature, the excess oxidizing agent is destroyed by the addition of a little methanol and the reaction mixture worked up in known manner, 92 mg. of a crystalline crude product being obtained which, for the purpose of purification, is dissolved in 10 cc. of a mixture of petroleum ether and benzene (1:1) and chromatographed through a column of 6 grams of aluminum oxide of activity I–II. 67 mg. of substance are eluted from the column with a mixture of petroleum ether and benzene (1:4) and with benzene and then recrystallized from acetone or chloroform-methanol. The product is the 11→18-lactone of 3:20-diketo-11β-hydroxy-5β-pregnane-18-acid which in the infra-red absorption spectrum exhibits bands at $5.64\mu$ (11→18-lactone) and at $5.85\mu$ (chloroform).

By brominating the 11→18-lactone of 3:20-diketo-11β-hydroxy-5β-pregnane-18-acid with one mol of bromine the corresponding 4-bromo derivative is obtained which, on being treated with lithium chloride in dimethylformamide, yields the 11→18-lactone of $\Delta^4$-3:20-diketo-11β-hydroxy-pregnene-18-acid which is identical in all its properties with the compound obtained by degradation of aldosterone.

*Example 2*

A solution of 1 gram of $\Delta^4$-3-keto-11β:18:20-trihydroxy-pregnene in 75 cc. of pyridine is treated with 1 gram of chromium trioxide for 3 hours at room temperature. Working up and chromatographic purification on silica gel yield 690 mg. of $\Delta^4$-3:11:18:20-tetraoxo-pregnene which exhibits in the infra-red spectrum (in chloroform) at $3.68\mu$, $5.87\mu$, $5.94\mu/6.19\mu$ the characteristic bands of its 4 carbonyl groups.

*Example 3*

A solution of 4.9 grams of chromium trioxide in 10 cc. of water and 140 cc. of glacial acetic acid is added at such a speed to a solution of 4.59 grams of 3α:11α:18:20α-tetrahydroxy-5β-pregnane in 300 cc. of glacial acetic acid while cooling with ice water and stirring that the internal temperature does not exceed 16° C. The reaction mixture is stirred for 17½ hours at room temperature, a solution of 3 grams of sodium sulfite in 50 cc. of water is added and the mixture evaporated to a volume of 100 cc. at a water-jet vacuum at a bath temperature of 40° C. The solution is diluted with 400 cc. of sodium chloride solution of 6% strength, extracted four times with 300 cc. of methylene chloride and the organic solution washed twice with 400 cc. of sodium chloride solution of 6% strength. The methylene chloride solutions are dried and evaporated at a water-jet vacuum and the residue dissolved in 50 cc. of benzene and chromatographed on 250 grams of silica gel (containing 15% of water). The fractions eluted with a mixture of benzene and ethyl acetate (9:1) are recrystallized from a mixture of methylene chloride and ether to yield 1.45 grams of the 18→20-lactone of 3:11-diketo-20α-hydroxy-5β-pregnane-18-acid melting at 213.5–214° C. Further recrystallization raises the melting point to 214.5–215° C. Optical rotation: $[\alpha]_D=+1°$ (in chloroform). Infrared spectrum (solvent: methylene chloride): $5.65\mu$ (γ-lactone) and $5.82\mu$ (3-ketone+11-ketone).

When a mixture of 0.267 gram of chromium trioxide and 0.23 cc. of sulfuric acid made up to 1 cc. with water is added to a solution of 102 mg. of 3α:11α:18:20α-tetrahydroxy-5β-pregnane in 12 cc. of acetone in the course of a minute with ice cooling and stirring, there are obtained after 10 minutes stirring at 0° C., working up and chromatography on silica gel, 15 mg. of the above described lactone.

A solution of 1.45 grams of the 18→20-lactone of 3:11-diketo-20α-hydroxy-5β-pregnane-18-acid in 45 cc. of glacial acetic acid is treated with 1.7 cc. of a 0.1 N-solution of hydrobromide in glacial acetic acid and then in the course of ten minutes with stirring with 12 cc. of a 0.735 N-solution of bromine in glacial acetic acid containing 386 mg. of sodium acetate. The reaction solution is diluted with 250 cc. of water, extracted three times with methylene chloride and the organic solutions washed once with 300 cc. of saturated sodium bicarbonate solution and once with 100 cc. of water. The organic solutions are dried and evaporated at a water-jet vacuum at a bath temperature of 35° C., the residue is added with 10 cc. of dimethylformamide to a mixture of 1.5 grams of dry lithium chloride, 1.5 grams of lithium carbonate and 30 cc. of dimethylformamide which has been previously heated in a current of nitrogen at 100° C. with stirring for 45 minutes and then cooled. The reaction mixture is heated for two hours in a current of nitrogen at 100° C. with stirring, allowed to stand overnight at room temperature and poured on to 150 cc. of water and 3 cc. of glacial acetic acid and extracted three times with 130 cc. of methylene chloride. The methylene chloride extracts are washed twice with 150 cc. of water, dried and evaporated at a water-jet vacuum. To remove dimethylformamide the reaction solution is dissolved in xylene, evaporated at a water-jet vacuum, and this operation is repeated once with xylene and once with benzene. The residue is chromatographed on 75 grams of silica gel (containing 15% of water). The crystalline fractions obtained with mixtures of benzene and ethyl acetate (9:11) and (4:1) are recrystallized from a mixture of methylene chloride and ether to yield 630 mg. of the 18→20-lactone of $\Delta^4$-3:11-diketo-20α-hydroxy-pregnene-18-acid which, after sublimation at 200° C. in a high vacuum and recrystallization, melts at 257° C. $\epsilon_{239\ m\mu}=14500$; optical rotation $[\alpha]_D=+140°$ (in chloroform). Infra-red spectrum (solvent: methylene chloride): $5.65\mu$ (γ-lactone); $5.80\mu$ (11-ketone) and $5.96\mu+6.16\mu$ ($\Delta^4$-3-ketone).

605 mg. of the 18→20-lactone of $\Delta^4$-3:11-diketo-20α-hydroxy-pregnene-18-acid are treated with a solution of 36 mg. of para-toluene-sulfonic acid in 60 cc. of ethylene glycol, whereupon 15 cc. of the solvent are distilled off at a water-jet vacuum in the course of 30 minutes with stirring. The violet colored reaction solution is then treated with 145 cc. of water and 5 cc. of saturated sodium bicarbonate solution and extracted three times with methylene chloride. The organic solutions are washed twice with water, dried and evaporated at a water-jet vacuum. The residue is chromatographed on 25 grams of silica gel (containing 15% of water). The fractions eluted with a mixture of benzene and ethyl acetate (9:1) are recrystallized from a mixture of methylene chloride and ether to yield 390 mg. of the 18→20-lactone of $\Delta^5$-3-ethylenedioxy - 11 - keto-20α-hydroxy-pregnene - 18 - acid which, after further recrystallization, melts at 274–275.5° C. Optical rotation: $[\alpha]_D=-23.5°$ (in chloroform). Infra-red spectrum (solvent: methylene chloride): $5.66\mu$ (γ-lactone); $5.82\mu$ (11-ketone) and $9.08\mu$ (ketal).

200 mg. of sodium boron hydride are added to a suspension of 130 mg. of the 18→20-lactone of $\Delta^5$-3-ethylenedioxy-11-keto-20α-hydroxy-pregnene-18-acid in 9 cc. of alcohol and 1 cc. of N-sodium hydroxide solution. After stirring for 4½ hours at room temperature, 10 cc. of tetrahydrofuran are added, the substance dissolving. 22 hours later a further 100 mg. of sodium boron hydride is added and the whole is then stirred for 28 hours at 40° C. The reaction solution is then poured on to water and 1 cc. of glacial acetic acid, extracted four times with methylene chloride, washed once with water, dried and evaporated at a water-jet vacuum. The crystalline residue consisting of the 18→11-lactone of $\Delta^5$-3-ethylenedioxy-11β:20α-dihydroxy-pregnene-18-acid is added with 5 cc. of pyridine to a mixture of 100 mg. of chromium trioxide and 5 cc. of pyridine with ice-cooling and stirring. The reaction mixture is stirred for 16 hours at room temperature, diluted with water and extracted three times with benzene and filtered through Celite to separate off any undissolved constituents. The organic solutions are washed twice more with water, dried and evaporated at a water-jet vacuum. The reaction mass is dissolved in xylene, evaporated again at a water-jet vacuum, and this operation is repeated once with benzene. The resulting crystalline residue is chromatographed on 8.5 grams of silica gel (containing 15% of water). The crystalline fractions eluted with a mixture of benzene and ethyl acetate (9:1) are recrystallized from a mixture of methylene chloride and ether to yield 43 mg. of the 18→11-lactone of Δ⁵-3-ethylenedioxy-11β-hydroxy-20-keto-pregnene - 18-acid melting at 239.5–240.5° C. Optical rotation: [α]$_D$= +1° (in chloroform). Its infra-red spectrum (solvent: methylene chloride) is identical with that of the authentic 18→11-lactone of d,l-Δ⁵-3-ethylenedioxy-11β-hydroxy-20-keto-pregnene-18-acid.

The conversion of this product into aldosterone is carried out in known manner by condensation of the oxalic ester to the 21-oxaloester melting at 160–175° C., iodisation, treatment with potassium acetate to form the 21-acetate melting at 237.5–239.5° C. (optical rotation [α]$_D$= −33° in chloroform) and hydrolysis to form the 18→11-lactone of Δ⁴-3:20-diketo-11β:21-dihydroxy-pregnene-18-acid melting at 214–217° C. (optical rotation [α]$_D$= +173° in chloroform). The above compound is subjected in known manner to ketalization, reduction with lithium aluminum hydride, acetylation and ketal-splitting to form the 21-monoacetate of aldosterone.

*Example 4*

250 mg. of 3α:11α:18:20α-tetrahydroxy-5β-pregnane are added to a mixture of 500 mg. of chromium trioxide and 10 cc. of pyridine with stirring and ice cooling and the mixture is then stirred for 15½ hours at room temperature. It is then diluted with water and extracted three times with benzene and then filtered through Celite to separate off any undissolved constituents. The organic solutions are washed twice with water, twice with 2 N-sodium carbonate solution and twice with water. The organic solutions are dried and evaporated in a water-jet vacuum and the residue dissolved in xylene, and this operation repeated once with benzene. Chromatography is carried out on 12.5 grams of silica gel (containing 15% of water) and the following compounds eluted successively with mixtures of benzene and ethyl acetate: (a) 8.5 mg. of the 18→20-lactone of 3:11-diketo-20α-hydroxy-5β-pregnane-18-acid described in Example 3. The infra-red spectra are identical. (b) 55 mg. of the 18→20-cyclohemiketal of 3:11:20-triketo-18-hydroxy-5β-pregnane melting at 186.5–194° C. Further recrystallization from a mixture of methylene chloride, ether and petroleum ether raises the melting point to 192.5–195.5° C. Infra-red spectrum (solvent: methylene chloride): 2.75μ+2.91μ (hydroxyl) and 5.82μ (3-ketone+11-ketone). (c) 10 mg. of 3:11:20-triketo-18-oxo-5β-pregnane melting at 248.5–252.5° C. Infra-red spectrum (solvent: methylene chloride): 3.61μ (aldehyde) and 5.82μ with inflexion at 5.78μ (3, 11 and 20-ketone+aldehyde).

*Example 5*

A solution of 70 mg. of 3:11-diketo-18:20α-dihydroxy-5β-pregnane in 10 cc. of acetone is treated for 30 minutes at 0° C. with 1 cc. of Kiliani solution. After adding a little methanol, the solution is worked up in the ordinary manner, 57 mg. of a neutral portion being obtained which crystallizes on being sprinkled with methanol. The crystals are filtered in a benzene solution through a small column of aluminum oxide of activity II, and the resulting (18→20)-lactone of 3:11-diketo-20α-hydroxy-5β-pregnane-18-acid has a constant melting point of 211–212° C. after being recrystallized three times from a mixture of acetone and heptane. Optical rotation: [α]$_D$= −0.5°. Infra-red spectrum: bands at 5.65μ and 5.81μ in Nujol.

*Example 6*

120 mg. of chromium trioxide dissolved in 5 drops of water and 10 cc. of glacial acetic acid are added to 150 mg. of 3β:18:20α-trihydroxy-5α-pregnane in 20 cc. of glacial acetic acid and the whole allowed to stand overnight at room temperature. The mixture is treated with a few drops of methanol and worked up with ether in the usual way. The crystalline crude product (168 mg.) is purified by chromatography on neutral aluminum oxide (activity II). With a mixture of petroleum ether and benzene (1:1) 90 mg. of 20α-hydroxy-3-keto-5α-pregnane-18-acid-lactone are eluted from the column which has a constant melting point of 174–175° C. after being crystallized three times from a mixture of methanol and water. Optical rotation [α]$_D$= +17°; infra-red spectrum; bands at 5.68μ and 5.84μ in chloroform.

500 mg. of sodium boron hydride are added to 130 mg. of the above lactone dissolved in 30 cc. of absolute dioxane and the whole boiled under reflux for 2 hours. The mixture is poured on to dilute sulfuric acid and worked up with ether in the ordinary manner. The resulting crude product (120 mg.) is purified by chromatography on neutral aluminum oxide (activity II). An oil (100 mg.) which cannot be made to crystallize is eluted with benzene. The crude hydroxy-lactone is acetylated overnight at room temperature with 10 cc. of pyridine-acetic anhydride (1:1). Usual working up yields a crystalline product (120 mg.) which is chromatographed on neutral aluminum oxide (activity II). With a mixture of petroleum and benzene (9:1) 75 mg. of 3β-acetoxy-20α-hydroxy-5α-pregnane-18-acid-lactone are eluted which, after being crystallized three times from a mixture of methanol and water, has a constant melting point of 196–197° C. Optical rotation: [α]$_D$= −14°; infra-red spectrum; bands at 5.68μ, 5.80μ and 8.00μ in chloroform.

To 35 mg. of this compound dissolved in 15 cc. of tetrahydrofuran about 200 mg. of lithium aluminum hydride are added and the mixture boiled under reflux for one hour. The excess lithium aluminum hydride is destroyed by adding water dropwise to the ice-cold mixture, the reaction product poured on to dilute sulfuric acid and worked up with ether in the usual manner. After being recrystallized twice from methanol-water the crystalline 3β:18: 20α-trihydroxy-5α-pregnane has a constant melting point of 124–125° C. [α]$_D$= +36°.

What is claimed is:

1. A member selected from the group consisting of a compound having the formula

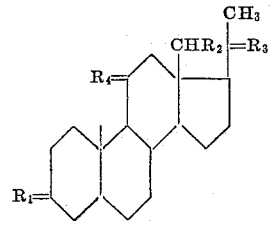

in which $R_1$, $R_2$ and $R_3$ each represents a member selected from the group consisting of =O and

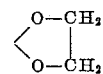

and $R_4$ a member selected from the group consisting of

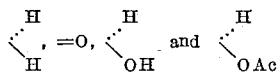

Ac being the acyl radical of a lower aliphatic carboxylic acid, the (11β:18)-cyclohemiacetials of the 11β-hydroxy-18-aldehydes, and the corresponding 5α-pregnane derivatives of all said compounds.

2. A member selected from the group consisting of a compound of the formula

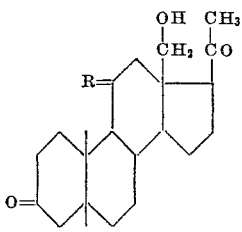

wherein R is a member selected from the group consisting of =O and

and their corresponding 5α-pregnane derivatives.

3. An 18:20-hemiketal of the compound claimed in claim 2.

4. 3:18:20-trioxo-5α-pregnane.

5. 3:11:18:20-tetraoxo-5β-pregnane.

6. 3:18:20-trioxo-11β-acetoxy-5α-pregnane.

7. Δ⁴-3:11:18:20-tetraoxo-pregnene.

8. 3:11:20-trioxo-18-hydroxy-5β-pregnane.

9. Process wherein an 18:20-lactone of Δ⁵-3-ethylene-dioxy-11-oxo-20-hydroxy-pregnene-18-acid is reduced in alkaline solution with sodium boron hydride and the resulting 18:11-lactone of Δ⁵-3-ethylene-dioxy-11β:20-dihydroxy-pregnene-18-acid oxidized with chromium trioxide in pyridine.

10. Process for the manufacture of a member selected from the group consisting of a 20-hydroxy-steroid 18-aldehyde and a 20-hydroxy-18-acid of the pregnane series and their cyclohemiacetals and lactones, wherein a member selected from the group consisting of an 18:20-dihydroxy-pregnane, an 18:20 - dihydroxy-allopregnane and Δ-4:5-derivatives thereof, is treated with a compound of hexavalent chromium.

11. Process as claimed in claim 10, wherein in a steroid-18-acid lactone obtained, after introduction of a 4:5-double bond and ketalization of oxo groups in 3- and 20-positions, the oxo group formed is reduced to the 11β-hydroxy-group by the aid of a complex light metal hydride and, in the compound thus obtained, the 20-hydroxy group is dehydrogenated to the 20-oxo group with a member selected from the group consisting of (1) a compound of hexavalent chromium and (2) an aluminum alcoholate in the presence of a ketone.

12. Process as claimed in claim 10, wherein in a steroid-18-aldehyde obtained, after introducing of a 4:5-double bond, and ketalization of oxo groups in 3-, 18- and 20-positions, the 11-oxo group formed is reduced to the 11β-hydroxy-group by the aid of a complex light metal hydride.

13. Process as claimed in claim 10, wherein there is used chromium trioxide in the presence of an acid.

14. Process as claimed in claim 10, wherein there is used chromium trioxide in pyridine.

15. Process as claimed in claim 10, wherein there is used sodium boron hydride as the complex light metal hydride in alkaline solution.

References Cited by the Examiner

Cainelli et al.: Helv. Chim. Acta, vol. 42, No. 3 (1959), pages 1124–1127.

Heusler et al.: Experientia, vol. 16, No. 1 (Jan. 15, 1960), pages 21–24.

LEWIS GOTTS, *Primary Examiner.*

LESLIE H. GASTON, *Examiner.*